ated Dec. 31, 1968

3,419,407
BINARY AZEOTROPES
John A. Riddick, Terre Haute, Ind., assignor to Commercial Solvents Corporation, New York, N.Y., a corporation of Maryland
No Drawing. Filed June 8, 1964, Ser. No. 373,572
12 Claims. (Cl. 106—311)

ABSTRACT OF THE DISCLOSURE

Binary azeotropic compositions of 2-nitropropane with 1-pentanol, ethoxy ethylene glycol, n-hexane, cyclohexane, n-heptane, methyl cyclohexane, n-octane, 2,2,4-trimethylpentane, n-nonane, ethyl benzene, and perchloroethylene.

---

This invention relates to binary azeotropes of 2-nitropropane.

Relatively volatile liquids, of course, have many important uses. They are solvents for a variety of resins and polymers making possible the formulation of lacquers and other protective coatings, printing inks, and spinning solutions for the manufacture of synthetic yarns and threads. Relatively volatile liquids also find use in the purification of chemicals and pharmaceuticals by precipitation from a solvent or by solvent extraction. Many other uses are well-known in the manufacturing industries.

In many of these uses, it is frequently desirable to employ a combination or mixture of liquids. Reasons for employing a mixture include (1) reduction of cost by using a cheap liquid along with an expensive one, (2) to obtain improved solvent power through synergistic action, (3) to separate materials by co-distillation, and (4) generally to achieve a combination of properties not possessed by one solvent alone.

Where the use of the mixture of liquids involves evaporation or distillation of the liquid, the use of a combination of liquids which form an azeotrope is particularly desirable. Azeotropes are well known and may be defined as combinations of two or more liquids which evaporate and boil in a particular ratio to each other and at a constant boiling point at a given pressure. A particular advantage in the use of such a combination is that during evaporation or distillation, no change occurs in the composition of the residual liquid. Although azeotropism is generally determined at the boiling point of the liquid combination, the effect is also present at lower temperatures as can readily be observed by the faster evaporation rate and higher vapor pressure of a combination as compared with the separate components. No dependable method for predicting the formation of an azeotrope has ever been discovered.

Many advantages accrue from the use of azeotropic combinations whenever applicable. For example, their use in the formulation of lacquers leads to faster drying without residual liquid in the lacquer film. Because of their faster evaporating characteristics they are eminently suitable in formulating printing inks for high-speed presses. A liquid impurity in a material to be purified may also frequently be removed by mixing it with another liquid with which it forms an azeotrope and distilling off the azeotrope.

It is an object of this invention to provide new binary azeotropes of 2-nitropropane. Other objects will be readily apparent to those skilled in the art.

It is the discovery on which the present invention is based that 2-nitropropane forms azeotropes with certain specific liquids. These liquids are: 1-pentanol, ethoxy ethylene glycol, n-hexane, n-heptane, n-octane, n-nonane, cyclohexane, methyl cyclohexane, 2,2,4-trimethylpentane, toluene, ethyl benzene, and perchloroethylene. With 2-nitropropane (boiling point 120° C. at atmospheric pressure) these liquids form azeotropes having the boiling point sand compositions shown in the following table. The composition of each azeotrope is expressed in two ways, one being the weight percent of the components, the other being the ratio of part by weight of the indicated component to one part by weight of 2-nitropropane.

BINARY AZEOTROPES OF 2-NITROPROPANE

| A-Component | Boiling point* of | | Composition of azeotrope | | |
|---|---|---|---|---|---|
| | Pure A, °C. | Azeotrope, °C. | Wt. percent of A | Wt. percent of 2-nitropropane | Parts by wt. of A to one part by wt. of 2-nitropropane |
| 1-pentanol | 138.1 | 119.5 | 15 | 85 | 0.177 |
| Ethoxy ethylene glycol | 135.1 | 119.7 | 14 | 86 | 0.163 |
| n-Hexane | 68.7 | 68 | 97 | 3 | 32.4 |
| n-Heptane | 98.4 | 94.5 | 79 | 21 | 3.76 |
| n-Octane | 125.7 | 111 | 53 | 47 | 1.13 |
| n-Nonane | 150.8 | 118 | 26 | 74 | 0.351 |
| Cyclohexane | 80.7 | 80 | 90 | 10 | 9 |
| Methyl cyclohexane | 100.9 | 96 | 78 | 22 | 3.55 |
| 2,2,4-trimethylpentane | 99.2 | 95 | 79 | 21 | 3.76 |
| Toluene | 110.6 | 109 | 82 | 18 | 4.56 |
| Ethyl benzene | 136.2 | 120 | 9 | 91 | 0.099 |
| Perchloroethylene | 121.2 | 114 | 57 | 43 | 1.33 |

*At one atmosphere.

In the practice of this invention, it is convenient for formulating purposes to mix one part by weight of 2-nitropropane with the weight of the second liquid selected to form the azeotropic composition as indicated for that liquid in the righthand column of the table. This mixture can be employed in the presence of other materials, it being only necessary that 2-nitropropane and the liquid selected be present in about the ratios indicated in the table.

When preparing a mixture, a commercial grade material is generally used for at least one of the components. The second component may also be commercial grade material or it may be previously mixed with another liquid. Any suitable order of mixing may be used in the practice of the invention. In the preparation of coatings and inks, for example, it may be preferred to dissolve or disperse one or more of the solids or liquids in one of the liquid components of this invention before the other liquid component is added.

The following examples are presented to illustrate the invention and to demonstrate the utility of this invention.

Example 1

An ink intended for printing on aluminum foil is prepared according to Formula No. 1 below. This ink is not fully satisfactory for printing on aluminum foil because a residual odor of toluene remains associated with the printed aluminum foil even after a prolonged drying period. A second ink, Formula No. 2, is formulated with 2-nitropropane to contain the toluene azeotropic composition of this invention specified in the above table. The table shows that an azeotrope of toluene and 2-nitropropane contains 82 wt. percent toluene and 18 wt. percent 2-nitropropane. In order to keep the solvent content in Formula No. 2 the same as that in Formula 1, 213.2 (82 percent of 260) parts by weight of toluene and 46.8 (18 percent of 260) parts by weight of 2-nitropropane are used. This second ink when applied to the aluminum foil dries rapidly and no trace of the odor of either toluene or 2-nitropropane remains associated with the foil.

PRINTING INK COMPOSITION

| Ingredients | Formula No. 1 (lbs.) | Formula No. 2 (lbs.) |
| --- | --- | --- |
| Pigment | 150 | 150 |
| Chlorinated rubber | 180 | 180 |
| Plasticizer | 60 | 60 |
| Toluene | 260 | 213.2 |
| 2-nitropropane | | 46.8 |

Example 2

A chemical substance has been isolated by solvent extraction with 2-nitropropane followed by crystallization and filtration. The filtered crystals retain a small amount of 2-nitropropane. To remove it, the crystalline substance is first slurried with sufficient hexane that there are about 32.4 parts hexane to about 1 part 2-nitropropane. Then the slurry is gently heated to about 68° C. at which temperature the 2-nitropropane is removed in the form of the azeotrope. There is no objection to an excess of hexane because any hexane remaining with the crystals can be readily removed by evaporation after all 2-nitropropane has been removed because of the relatively low boiling point of the hexane.

Example 3

It is desired to prepare n-nonane substantially free from n-octane from a mixture of these liquids. At one atmosphere pressure, n-nonane boils at 150.8° C., n-octane boils at 125.7° C.; however, the 2-nitropropane azeotrope with n-octane boils at 111° C. The azeotrope contains 53 percent by weight of n-octane. Accordingly, it would be easier to separate the 2-nitropropane-n-octane azeotrope from the n-nonane because of the greater difference in boiling points. For each part of n-octane present, 0.9 (1/1.13) parts 2-nitropropane are added. The n-octane azeotrope is separated by distillation at 111° C. When the separation is complete, any excess of 2-nitropropane may be readily distilled off by increasing the temperature to 118° C. thereby removing the 2-nitropropane as the n-nonane azeotrope.

Having described this invention, what is claimed is:

1. In combination, a liquid composition consisting of 2-nitropropane, 1 part, and a liquid selected from the group consisting of 1-pentanol 0.177 part, ethoxy ethylene glycol 0.163 part, n-hexane 32.4 parts, cyclohexane 9 parts, n-heptane 3.76 parts, methyl cyclohexane 3.55 parts, n-octane 1.13 parts, 2,2,4-trimethylpentane 3.76 parts, n-nonane 0.351 part, ethyl benzene 0.099 part, and perchloroethylene 1.33 parts.

2. A composition consisting of n-pentanol and 2-nitropropane in the weight ratio of about 0.177 part by weight of n-pentanol to 1 part by weight of 2-nitropropane.

3. A composition consisting of ethoxy ethylene glycol and 2-nitropropane in the weight ratio of about 0.163 part by weight of ethoxy ethylene glycol to about 1 part by weight of 2-nitropropane.

4. A composition consisting of n-hexane and 2-nitropropane in the weight ratio of about 0.351 part by weight of n-nonane to about 1 part by weight of 2-nitropropane.

5. A composition consisting of n-heptane and 2-nitropropane in the weight ratio of about 3.76 parts by weight of n-heptane to about 1 part by weight of 2-nitropropane.

6. A composition consisting of n-octane and 2-nitropropane in the weight ratio of about 1.13 parts by weight of n-octane to about 1 part by weight of 2-nitropropane.

7. A composition consisting of n-nonane and 2-nitropropane in the weight ratio of about 0.351 parts by weight of n-nonane to about 1 part by weight of 2-nitropropane.

8. A composition consisting of cyclohexane and 2-nitropropane in the weight ratio of about 9 parts by weight of cyclohexane to about 1 part by weight of 2-nitropropane.

9. A composition consisting of methyl cyclohexane and 2-nitropropane in the weight ratio of about 3.55 parts by weight of methyl cyclohexane to about 1 part by weight of 2-nitropropane.

10. A composition consisting of 2,2,4-trimethylpentane and 2-nitropropane in the weight ratio of about 3.76 parts by weight of 2,2,4-trimethylpentane to about 1 part by weight of 2-nitropropane.

11. A composition consisting of ethyl benzene and 2-nitropropane in the weight ratio of about 0.099 part by weight of ethyl benzene to about 1 part by weight of 2-nitropropane.

12. A composition consisting of perchloroethylene and 2-nitropropane in the weight ratio of about 1.33 parts by weight of perchloroethylene to about 1 part by weight of 2-nitropropane.

References Cited

UNITED STATES PATENTS

| 2,192,583 | 3/1940 | Bogin | 260—32.4 |
| 2,366,414 | 1/1945 | Lindh | 260—32.4 X |
| 2,541,380 | 2/1951 | Polly et al. | 252—36.4 X |
| 2,739,954 | 3/1956 | Fryling | 260—32.4 X |
| 2,941,974 | 6/1960 | Reymann et al. | 260—32.4 X |

OTHER REFERENCES

Bennette, R. R., New Developments in Nitroparaffin Solvents, In Federation of Societies for Paint Technology (Official Digest), 1960, vol. 32, No. 428, pp. 1165–75 TP 934 K 29.

Lecat, Maurice, Azeotropes de Nitroderives, In Societe Scient. De Bruxelle, Annales Serie I, 1947–48, vol. 61–62, pp. 79–98 (106–311).

Shorr, L. M., A correlation Method for Binary Azeotrope Data In Journal of Applied Chemistry, 1964, vol. 14, No. 9, pp. 376–82. TP 1 J 91.

JULIUS FROME, Primary Examiner.

JOAN B. EVANS, Assistant Examiner.

U.S. Cl. X.R.

252—364; 260—32.4, 33.4, 33.6, 33.8, 32.8; 106—32, 20